US012667524B2

(12) United States Patent
Besser et al.

(10) Patent No.: US 12,667,524 B2
(45) Date of Patent: Jun. 30, 2026

(54) NASOGASTRIC TUBE

(71) Applicant: ENVUE MEDICAL HOLDINGS, CORP., Dover, DE (US)

(72) Inventors: Doron Besser, Tel Aviv (IL); Guy Ben Ezra, Karkur (IL)

(73) Assignee: ENVUE MEDICAL HOLDINGS, CORP., Dover, DE (US)

( * ) Notice: Subject to any disclaimer, the term of this patent is extended or adjusted under 35 U.S.C. 154(b) by 102 days.

(21) Appl. No.: 17/183,672

(22) Filed: Feb. 24, 2021

(65) Prior Publication Data

US 2021/0196577 A1 Jul. 1, 2021

Related U.S. Application Data

(62) Division of application No. 15/322,127, filed as application No. PCT/IL2014/050576 on Jun. 26, 2014, now abandoned.

(51) Int. Cl.
*A61J 15/00* (2006.01)

(52) U.S. Cl.
CPC ......... *A61J 15/003* (2013.01); *A61J 15/0003* (2013.01); *A61J 15/0073* (2013.01); *A61J 15/0084* (2015.05); *A61J 15/0092* (2013.01)

(58) Field of Classification Search
CPC .. A61B 5/05; A61B 5/06; A61B 5/061; A61B 5/062; A61M 2210/1032; A61M 16/04; A61M 16/0402; A61M 16/0409; A61M 16/0461; A61M 16/0465; A61M 16/0472; A61M 16/0475; A61M 16/0477; A61M 16/0479; A61M 16/0481; A61M 16/0484; A61M 16/0486; A61M 1/75; A61J 15/0073; A61J 15/0003; A61J 15/003
See application file for complete search history.

(56) References Cited

U.S. PATENT DOCUMENTS

| | | | | | |
|---|---|---|---|---|---|
| 3,659,605 | A | * | 5/1972 | Sielaff | A61M 1/75 604/65 |
| 4,356,824 | A | * | 11/1982 | Vazquez | A61J 15/0069 604/35 |
| 4,904,238 | A | | 2/1990 | Williams | |
| 4,968,307 | A | | 11/1990 | Dake et al. | |
| 5,389,047 | A | | 2/1995 | Parker et al. | |
| 5,707,351 | A | | 1/1998 | Dorsey, III | |

(Continued)

FOREIGN PATENT DOCUMENTS

| | | | |
|---|---|---|---|
| EP | 2301512 | A2 | 3/2011 |
| WO | 2003034976 | A1 | 5/2003 |

(Continued)

OTHER PUBLICATIONS

PCT Search Report for International Application No. PCT/IL2014/050576; mailed Oct. 19, 2014; 4 pp.

(Continued)

*Primary Examiner* — Shefali D Patel
*Assistant Examiner* — William R Frehe
(74) *Attorney, Agent, or Firm* — The Roy Gross Law Firm, LLC; Roy D. Gross

(57) ABSTRACT

A method comprising a nasogastric tube comprising a feeding mechanism, a suction mechanism configured to sealingly draw an inner wall of an esophagus against said nasogastric tube, and a gastric decompression mechanism.

15 Claims, 5 Drawing Sheets

(56) References Cited

U.S. PATENT DOCUMENTS

| | | | |
|---|---|---|---|
| 6,126,647 | A | 10/2000 | Posey et al. |
| 6,165,164 | A | 12/2000 | Hill et al. |
| 6,695,764 | B2 * | 2/2004 | Silverman ................. A61F 2/04 600/29 |
| 6,790,214 | B2 | 9/2004 | Kraemer et al. |
| 6,949,092 | B1 * | 9/2005 | Moss .................. A61J 15/0003 604/508 |
| 7,794,425 | B2 | 9/2010 | Gobel |
| 7,967,780 | B2 | 6/2011 | Gobel |
| 8,100,874 | B1 | 1/2012 | Jordan et al. |
| 8,453,648 | B2 | 6/2013 | Black et al. |
| 2003/0208209 | A1 | 11/2003 | Gambale et al. |
| 2004/0082909 | A1 | 4/2004 | Shia et al. |
| 2004/0153098 | A1 | 8/2004 | Chin et al. |
| 2004/0220515 | A1 | 11/2004 | Constantz |
| 2005/0059962 | A1 | 3/2005 | Phan et al. |
| 2005/0137574 | A1 | 6/2005 | Sakal et al. |
| 2006/0173407 | A1 | 8/2006 | Shaughnessy et al. |
| 2008/0077043 | A1 | 3/2008 | Malbrain et al. |
| 2008/0195047 | A1 | 8/2008 | Price |
| 2009/0069796 | A1 | 3/2009 | Oskin |
| 2009/0306626 | A1 | 12/2009 | Sinha et al. |
| 2009/0317760 | A1 | 12/2009 | Gadbois |
| 2010/0030133 | A1 | 2/2010 | Elia et al. |
| 2010/0228221 | A1 | 9/2010 | Kassab et al. |
| 2011/0046653 | A1 | 2/2011 | Addington et al. |
| 2011/0130650 | A1 | 6/2011 | Dayan et al. |
| 2012/0150111 | A1 | 6/2012 | Hershey et al. |
| 2013/0158471 | A1 | 6/2013 | Neel et al. |
| 2013/0310806 | A1 | 11/2013 | Nevler et al. |
| 2014/0066880 | A1 | 3/2014 | Prince et al. |
| 2014/0088359 | A1 | 3/2014 | Quaye |
| 2014/0100531 | A1 | 4/2014 | Ankrum et al. |
| 2014/0188080 | A1 | 7/2014 | Besser et al. |
| 2014/0235960 | A1 * | 8/2014 | Addington .......... A61J 15/0049 604/35 |
| 2015/0174013 | A1 * | 6/2015 | Besser ................ A61J 15/0073 600/109 |

FOREIGN PATENT DOCUMENTS

| | | | | |
|---|---|---|---|---|
| WO | 2006076214 | A2 | 7/2006 | |
| WO | 2007095541 | A2 | 8/2007 | |
| WO | WO-2013012774 | A1 * | 1/2013 | .......... A61J 15/0073 |
| WO | 2015198297 | A1 | 12/2015 | |
| WO | 2016024260 | A1 | 2/2016 | |

OTHER PUBLICATIONS

PCT Written Opinion for International Application No. PCT/IL2014/050576; mailed Oct. 19, 2014; 6 pp.

PCT Preliminary Report for International Application No. PCT/IL2014/050576; dated Dec. 27, 2016 ; 7 pp.

* cited by examiner

NASOGASTRIC TUBE

CROSS REFERENCE TO RELATED APPLICATION

This application is a continuation of U.S. patent application Ser. No. 15/322,127 filed Dec. 26, 2016, which is a 35 U.S.C. § 371 National Phase Application of PCT/IL2014/050576 filed Jun. 26, 2014, the contents of which are all incorporated herein by reference in their entirety.

FIELD OF THE INVENTION

The present invention relates generally to nasogastric tubes.

BACKGROUND

Enteral feeding is a form of hyperalimentation and metabolic support in which nutrient formulas or medicaments are delivered directly to the GI tract, either to the stomach or the duodenum. A nasogastric tube (NGT) is used for feeding and administering drugs and other oral agents. The tube is inserted into the patient's esophagus and stomach in order to ensure the passage of the agents into the stomach and not into the lungs. The NGT can also be used for suction of fluids from the stomach.

However, the use of NGTs can have disadvantages. Minor complications include nose bleeds, sinusitis, and a sore throat. Sometimes more significant complications occur including erosion of the nose where the tube is anchored, esophageal perforation, pulmonary aspiration, a collapsed lung, or intracranial placement of the tube.

Even worse, during feeding, excessive gastric pressure may result. From time to time, the body relieves such excess gastric pressure by expelling gas or liquid or reflux fluid. The fluids are expelled from the stomach through the esophagus to the mouth or nasal pathways. The reflux fluids may be inhaled into the lungs with possible risk of aspiration pneumonia, bacterial infection in the pharynx or esophagus or any other ailments. Accordingly, numerous studies have linked the use of the NGT to an increase in ventilator-associated pneumonia (VAP). VAP is the most common nosocomial infection in the intensive care unit (ICU), and it is associated with prolonged hospitalization, increased health care costs, and high attributable mortality.

US Patent Application Publication No. 2013/0310806 provides a nasogastric tube including a main lumen having one or more proximal connectors for connecting to a source of substances or pressure, and one or more vacuum lumens peripherally surrounding the main lumen, each vacuum lumen including a vacuum sealing portion which includes one or more suction ports for sealingly drawing an inner wall of an esophagus thereagainst.

There exists a pressing need for an NGT that is capable of significantly reducing the risk of reflux food and developing VAP, as well as simultaneously removing excessive gastric gas by gastric decompression.

SUMMARY

The following embodiments and aspects thereof are described and illustrated in conjunction with systems, tools and methods which are meant to be exemplary and illustrative, not limiting in scope.

There is provided, in accordance with an embodiment, a system comprising a nasogastric tube comprising a feeding mechanism, a suction mechanism configured to sealingly draw an inner wall of an esophagus against said nasogastric tube, and a gastric decompression mechanism.

There is provided, in accordance with another embodiment, a system comprising: a nasogastric tube having a length and comprising: (a) a main lumen having one or more proximal connectors configured to connect to a source of substances or pressure; (b) at least four vacuum lumens peripherally surrounding said main lumen; (c) at least four suction ports configured to sealingly draw an inner wall of an esophagus thereagainst, each of said at least four suction ports associated with a different one of said at least four vacuum lumens, wherein said at least four suction ports are distributed between at least two different locations along the length of said nasogastric tube; and (d) at least one gastric decompression port associated with at least one of said at least four vacuum lumens, said at least one gastric decompression port being disposed distally to the at least two different locations along the length of said nasogastric tube.

There is provided, in accordance with another embodiment, a system comprising a nasogastric tube having a length and comprising: (a) a main lumen having one or more proximal connectors configured to connect to a source of substances or pressure; (b) at least four suction ports each associated with a different one of at least four vacuum lumens peripherally surrounding said main lumen, said at least four suction ports are configured to sealingly draw an inner wall of an esophagus thereagainst, wherein said at least four suction ports are distributed between at least two different locations along the length of said nasogastric tube; and (c) at least one gastric decompression port associated with an additional at least one vacuum lumen, said at least one gastric decompression port being disposed distally to the at least two different locations along the length of said nasogastric tube.

There is further provided, in accordance with an embodiment, a method comprising: introducing a nasogastric tube into an esophagus of a patient, said nasogastric tube comprising a feeding mechanism, a suction mechanism configured to sealingly draw an inner wall of an esophagus against said nasogastric tube, and a gastric decompression mechanism; applying vacuum so as to decompress gastric gas; and applying vacuum so as to sealingly draw an inner wall of an esophagus thereagainst.

There is further provided, in accordance with an embodiment, a method comprising: introducing a nasogastric tube into an esophagus of a patient, said nasogastric tube having a length and comprising a main lumen having one or more proximal connectors for connecting to a source of substances or pressure, four or more vacuum lumens peripheral to said main lumen, four or more suction ports, each of said four or more suction ports associated with a different one of said four or more vacuum lumens, wherein said four or more suction ports are distributed between at least two different locations along the length of said nasogastric tube, and at least one gastric decompression port being disposed distally to the at least two different locations along the length of said nasogastric tube; applying vacuum so as to decompress gastric gas; and applying vacuum interchangeably to said four or more vacuum lumens so as to sealingly draw an inner wall of an esophagus thereagainst, each time in a different location along said esophagus.

In some embodiments, the method of the invention further comprises applying vacuum so as to aspirate fluids from the esophagus.

In some embodiments, the system further comprises a vacuum source connected to said vacuum lumens.

In some embodiments, said vacuum lumens are connected to said vacuum source via a pressure regulator and a valve.

In some embodiments, said main lumen and said vacuum lumens are constructed as one unit.

In some embodiments, said vacuum lumens are a separate unit from said main lumen, and wherein said vacuum lumens are slidable relative to said main lumen.

In some embodiments, said main lumen and said vacuum lumens are arranged as concentrically arranged conduits.

In some embodiments, the system further comprises one or more auxiliary suction ports proximal to said at least four suction ports.

In some embodiments, each of said at least four suction ports comprises a graduated edging.

In some embodiments, the system further comprises a manifold configured to connect said vacuum lumens to said valve.

In some embodiments, said manifold is transparent.

In some embodiments, said vacuum lumens comprise at least six vacuum lumens.

In some embodiments, at least one of said at least four suction ports comprises two or more suction ports, successively arranged along a portion of the length of said nasogastric tube.

In some embodiments, said nasogastric tube further comprises two or more longitudinal radiopaque stripes.

In some embodiments, said two or more longitudinal radiopaque stripes are embedded in an outer wall of said nasogastric tube.

In some embodiments, the method further comprises regulating the vacuum so that a suction level is not constant over time.

In some embodiments, the method further comprises regulating vacuum to said four or more suction ports of said four or more vacuum lumen, so as to create peristaltic movement or other oscillatory movement of the esophagus.

In some embodiments, said applying of the vacuum restricts at least 60% of passage through the esophagus.

In some embodiments, the method further comprises visually monitoring a transparent manifold coupling said four or more vacuum lumens with said valve for backflow of gastric substances.

In addition to the exemplary aspects and embodiments described above, further aspects and embodiments will become apparent by reference to the figures and by study of the following detailed description.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figures 1, 2, 3:
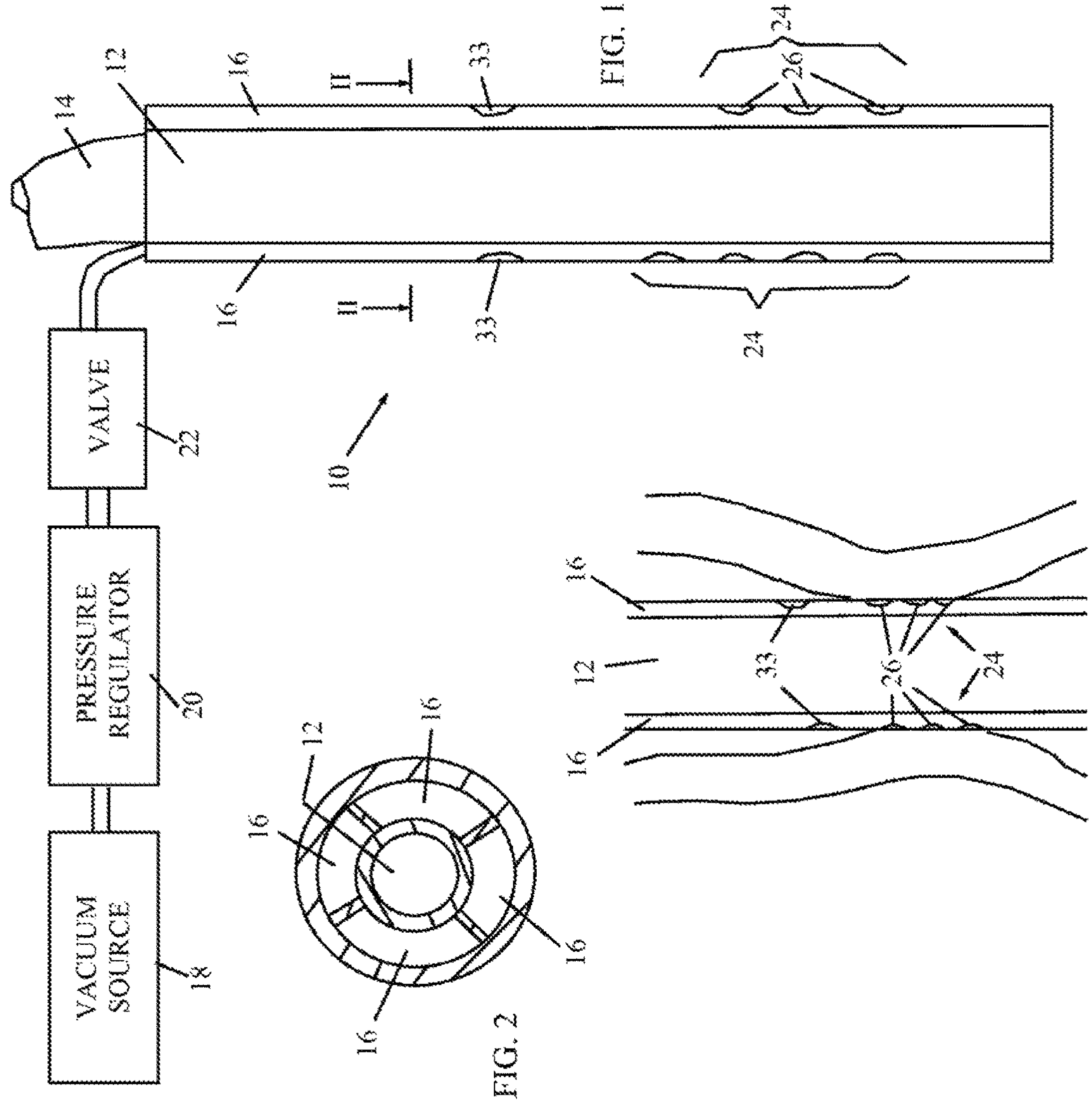
FIG. 1 is a simplified schematic illustration of a nasogastric tube, constructed and operative in accordance with a non-limiting embodiment of the present invention.
FIG. 2 is a simplified sectional illustration of the NGT of FIG. 1, taken along lines II-II in FIG. 1.
FIG. 3 is a simplified schematic illustration of the nasogastric tube being used to suck and seal the inner wall of the esophagus against the NGT, in accordance with an embodiment of the present invention.

The present invention provides a system comprising a nasogastric tube (NGT) and a method thereof, as is described more in detail hereinbelow. The system includes an NGT and a vacuum control unit. The vacuum control unit couples the esophagus to the tube thus disabling the reflux of the food along the esophagus to the trachea. Furthermore, the vacuum control unit enables decompression of a subject's abdomen, including but not limited to the stomach or intestines.

According to some embodiments, the NGT of the present invention is configured to perform as a feeding tube as well as a gastric decompression tube. Thus, the NGT enables administration of nutrients or drugs directly to a subject's stomach or intestines and simultaneously or interchangeably enables gastric decompression.

In accordance with an embodiment, the invention provides a system comprising an NGT comprising a feeding mechanism, a suction mechanism configured to sealingly draw an inner wall of an esophagus thereagainst, and a gastric decompression mechanism. In some embodiments, the suction mechanism is further configured to aspirate fluids from the esophagus. As will be described in more detail hereinbelow, the suction mechanism and the gastric decompression mechanism are, in some embodiments, disposed (situated) and associated by one or more same lumens. In other embodiments, the suction mechanism and the gastric decompression mechanism are configured to perform by independent lumens.

According to some embodiments, the NGT is composed of at least one main lumen and a plurality of peripheral lumens, wherein a portion of said plurality of peripheral lumens comprise at least one gastric decompression port and a portion of said plurality of peripheral lumens comprise at least one suction port configured to sealingly draw an inner wall of an esophagus thereagainst.

According to additional embodiments, the NGT is composed of at least one main lumen, one or more lumens comprising at least one gastric decompression port and one or more peripheral lumens comprising at least one suction port configured to sealingly draw an inner wall of an esophagus thereagainst.

Furthermore, the structure of an NGT, according to some embodiments of the present invention, enables locally selective application of the vacuum within the esophagus. Thus, the location of the esophagus coupling to the tube may be changed in time in order to diminish tissue damage to the esophagus.

According to some embodiments, the peripheral (vacuum) lumens are configured to aspirate fluids such as gastric reflux from the esophagus. In some embodiments, said at least one suction port is configured to aspirate fluids from the esophagus. By virtue of applying vacuum to the peripheral lumens of the NGT described herein, the at least one suction port is used for sealingly drawing an inner wall of an esophagus thereagainst and interchangeably or simultaneously aspirate fluids from the esophagus. One skilled in the art will is well capable of determining the vacuum pressure to be applied for sealing the esophagus and/or aspirating fluids from the esophagus.

An NGT according to the present invention can be used in ICU, or elsewhere, in order to reduce the complications associated with reflux such as the risk of VAP and in order to prevent or reduce tissue damage.

According to the present invention, the inner wall of the esophagus is drawn by negative pressure (vacuum) towards and against the outer contour of the NGT. A vacuum control unit, which is connected to the hospital vacuum unit or any other vacuum unit, enables either simultaneous vacuum pressure in one or more suction units of the NGT or changeable vacuum pressure between the different suction units. In this way, the NGT of the present invention prevents reflux and aspiration of substances or liquids into the patient's lungs and prevents tissue damage, while obviating the need to remove and replace the entire device from the patient's esophagus.

In some embodiments, a tube according to the present invention may be used in other locations in the GI tract or in any other body lumen, such as arteries, veins, etc. However, for simplicity of discussion, this tube is referred to throughout the specification as an NGT.

Reference is now made to FIGS. 1 and 2, which illustrate a nasogastric tube 10, constructed and operative in accordance with a non-limiting embodiment of the present invention.

NGT 10 includes a main (typically, but not necessarily, central) lumen 12. Main lumen 12 may be used to feed and administer drugs and other oral agents, and may also be used for sucking fluids from the stomach. As such, as is known in the art, main lumen 12 may be a double lumen, one lumen for feeding and the other lumen for suction (not to be confused with the vacuum lumens mentioned later). Main lumen 12 is provided with one or more suitable proximal connectors 14 for connecting to a source of substances for feeding or administering, and optionally to a source of pressure (e.g., suction), as is known in the art.

NGT 10 includes one or more vacuum lumens 16 that peripherally surround main lumen 12. The term "peripherally surround" as used in the description and claims, encompasses continuous surrounding (no gaps between the vacuum lumens or one continuous, peripheral vacuum lumen) and discontinuous surrounding (wherein there are separations between discrete vacuum lumens). In one embodiment, illustrated in FIG. 2, there are four vacuum lumens 16 peripherally spaced around main lumen 12; the invention is not limited to this number of vacuum lumens. The vacuum lumens 16 may be equally or unequally spaced from each other. Main lumen 12 and vacuum lumens 16 are thus arranged as concentrically arranged conduits. Vacuum lumens 16 are coupled with a vacuum source 18, such as via a pressure regulator 20 and a valve 22, which form a vacuum control unit.

Main lumen 12 may be constructed from any suitable biocompatible material, such as but not limited to, polyurethane, silicone, polyvinyl chloride and many others. The vacuum lumens 16 may be constructed of similar materials, but alternatively may be constructed of medically safe metals, such as but not limited to, stainless steel, titanium alloys, NITINOL and others. Generally, without limitation, main lumen 12 may have a length in the range of 50 to 150 cm, with an outside diameter in the range of 5-12 Fr.

Main lumen 12 and vacuum lumens 16 may be constructed as one unit. Alternatively, vacuum lumens 16 may form a separate unit which is slid over main lumen 12 after insertion of main lumen 12 into the patient body. As another alternative, vacuum lumens 16 may be first introduced into the patient, and main lumen 12 may be slid in between vacuum lumens 16.

With reference to FIG. 1, vacuum lumen 16 may include a vacuum sealing portion 24, which includes one or more suction ports 26. As shown in FIG. 1, some vacuum lumens 16 may have more suction ports than others. As shown in FIG. 3, upon application of vacuum generated by vacuum source 18, the inner wall of the esophagus is drawn by negative pressure towards and against suction ports 26 (the outer contour of NGT 10). The outer contour of NGT 10, at least at vacuum sealing portion 24, is preferably round (circular or oval), for better conforming to and sealing of the esophagus. In one embodiment, the vacuum sealing restricts at least 60% of the passage through the esophagus.

Pressure regulator 20 may be used to reduce or otherwise regulate the negative pressure generated by vacuum source 18. For example, pressure regulator 20 may be used to match the vacuum level generated by vacuum source 18 to the vacuum level needed in vacuum sealing portion 24. Such vacuum pressure may be, for example, between 0.5-50, 50-100, 100-200, 200-300, 300-400, 400-500, 500-600 or 600-760 mmHg. Different vacuum pressure values may be suitable to different patients and/or to different luminal structures into which the tube of the present invention is inserted. Furthermore, vacuum lumen 16 includes a gastric decompression port as will be described in more detail hereinbelow. In some embodiments, vacuum lumen 16 including a gastric decompression port 23 also includes one or more suction ports 26, or alternatively is devoid of suction ports 26. Upon application of vacuum generated by vacuum source 18, a subject's abdomen (e.g., stomach and/or intestines) is decompressed to remove gastric gas, excessive reflux or the like. Pressure regulator 20 may apply vacuum pressure, for example, between 0.5-50, 50-100, 100-200, 200-300, 300-400, 400-500, 500-600 or 600-760 mmHg, required for gastric decompression. Those of skill in the art will recognize that the required vacuum pressure may be dependent on the amount of gas and/or excessive reflux being decomposed, as well as whether the vacuum pressure is applied in a constant or pulse manner. Valve 22 may provide variability to the applied vacuum pressure to vacuum lumen 16 which includes decompression port 23. Valve 22 may be used to shift the vacuum between the different vacuum lumens 16 so that the suction level is not constant over time in the vacuum sealing portion 24, which may provide variability in how the esophagus wall is sucked in, and for how long.

NGT 10 may be provided with different numbers of vacuum sealing portions 24 and suction ports 26, and the vacuum to the sealing portions 24 may be regulated so as to create peristaltic movement or other oscillatory movement of the esophagus.

In accordance with an embodiment of the invention, one or more auxiliary suction ports 33 are provided proximal to vacuum sealing portion 24. Since vacuum sealing portion 24 seals off the esophagus, any oropharyngeal secretions, such as saliva, may accumulate above (i.e., proximal to) vacuum sealing portion 24. Auxiliary suction ports 33 may be used to suck and remove such secretions. Additionally or alternatively, one or more of vacuum lumens 16 may be used to evacuate liquids arriving from the patient's stomach. That is, if a reflux occurs, one or more of vacuum lumens 16 may withdrawn at least a portion of it, through decompression port(s) 23 and/or suction ports 26, towards valve 22. There, the stomach contents may be collected inside a suitable reservoir and then discarded.

Vacuum source 18 is preferably activated following the insertion and localization of NGT 10 in the esophagus in order to reduce the risk of VAP, or other bacterial infections, by preventing or minimizing reflux food and liquid aspiration into the lungs.

Figure 5:
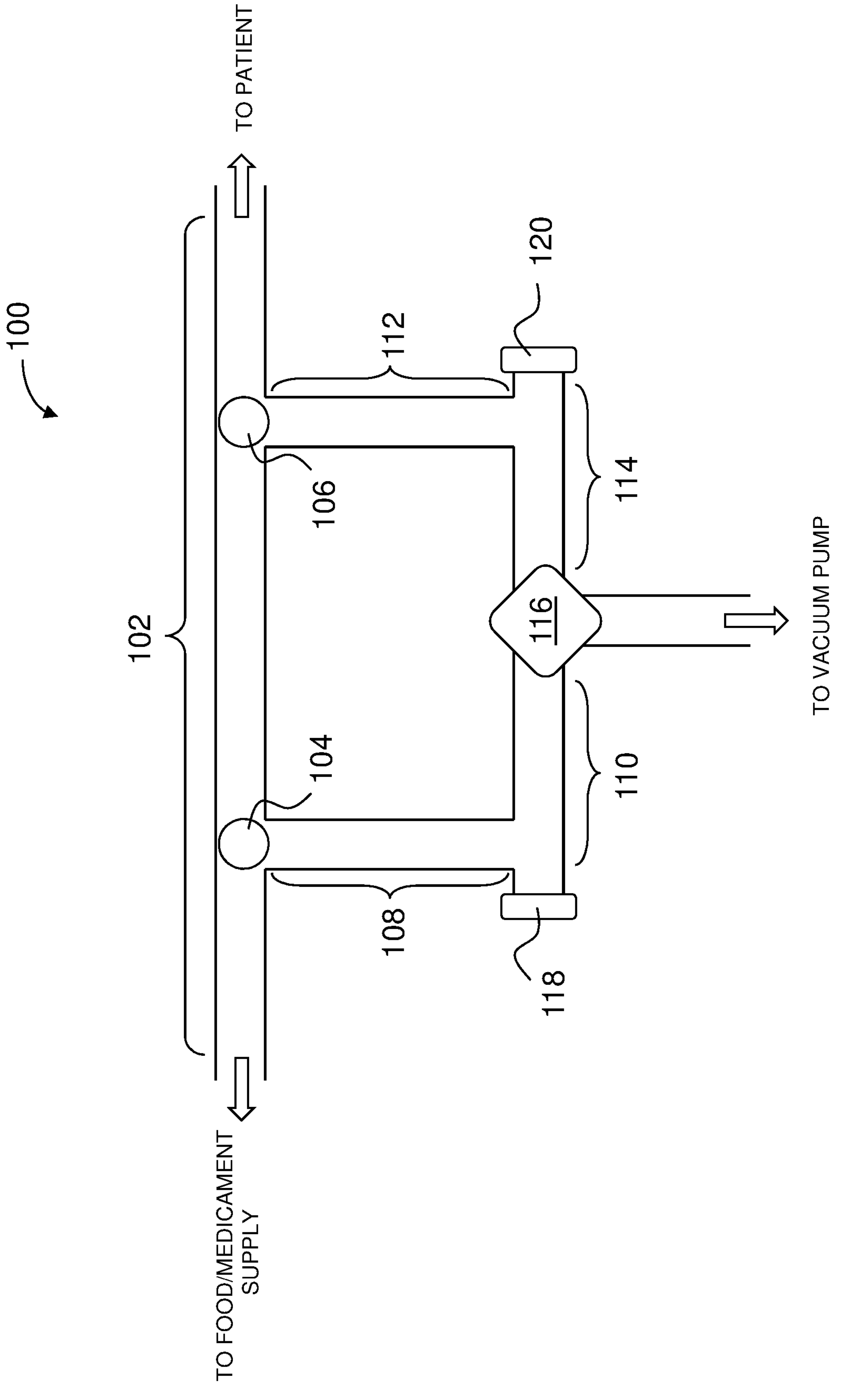
FIG. 5 is a schematic diagram of a manifold.

Reference is now made to FIG. 5, which shows a schematic diagram of a manifold 100, which, in accordance with some embodiments, serves as valve 22 of FIG. 1. Manifold 100 may be used to interconnect tubes extending between the patient, the food and/or medicament supply, and the vacuum source (e.g. a vacuum pump).

A main tube 102 may extend between the patient and the food and/or medicament supply. Main tube 102 may include, at manifold 100, two or more junctions 104 and 106. Junctions 104 and 106 may be used for alternating between different vacuum lumens or groups of vacuum lumens. That is, each of junctions 104 and 106 may interconnect different vacuum lumens or groups of vacuum lumens to the vacuum source. Junction 104, for example, may be connected to the vacuum source via a first tube (represented by tube portions 108 and 110). Junction 106, for example, may be connected to the vacuum source via a second tube (represented by tube portions 112 and 114). Tube portions 110 and 114 may be connected to the vacuum source through a selector 100. Selector 116 may have two possible states: In the first state, negative pressure from the vacuum source is channeled towards portion 110 and from there to junction 104. In the second state, negative pressure from the vacuum source is channeled towards portion 114 and from there to junction 106. In embodiments where more than two junctions are present (not shown), a selector may have a number of states corresponding to the number of junctions.

Optionally, manifold 100 may include one or more vacuum discharge ports, for releasing negative pressure from a certain vacuum lumen or a group of vacuum lumens after the negative pressure has been switched away from this lumen or group of vacuum lumens by selector 116. Two exemplary vacuum discharge ports 118 and 120 are shown in the figure. Optionally, the vacuum discharge ports 118 and 120 may each be a cap threadable at some point between selector 116 and junctions 104 and 106, respectively. After the caregiver has switched the vacuum from a first vacuum lumen (or a first group of lumens) to a second vacuum lumen (or a second group of lumens), he or she may use the suitable one of vacuum discharge ports 118 and 120 in order to immediately discharge the negative pressure from the first vacuum lumen (or the first group of lumens). This way, the inner wall of the esophagus, at the vacuum port(s) connected to the first vacuum lumen (or the first group of lumens), may be immediately released from the vacuum port(s) and tissue damage may be prevented or at least mitigated.

One method of using NGT 10 of the present invention includes the following steps, without limitation and not necessarily in sequential order:

a) introducing NGT 10 into the esophagus of the subject;
b) applying vacuum to one or more of the vacuum sealing portion(s) 24;
c) adjusting the vacuum level (which may be done before step a);
d) after achieving a desired sealing of the esophagus wall to NGT 10, changing the vacuum intervals between the vacuum lumens 16, manually or automatically, such that NGT 10 remains intact to the esophagus; and
(e) applying, manually or automatically, vacuum to one or more of vacuum lumen 16 which include decompression port(s) 23.

Figures 4A, 4B, 4C:
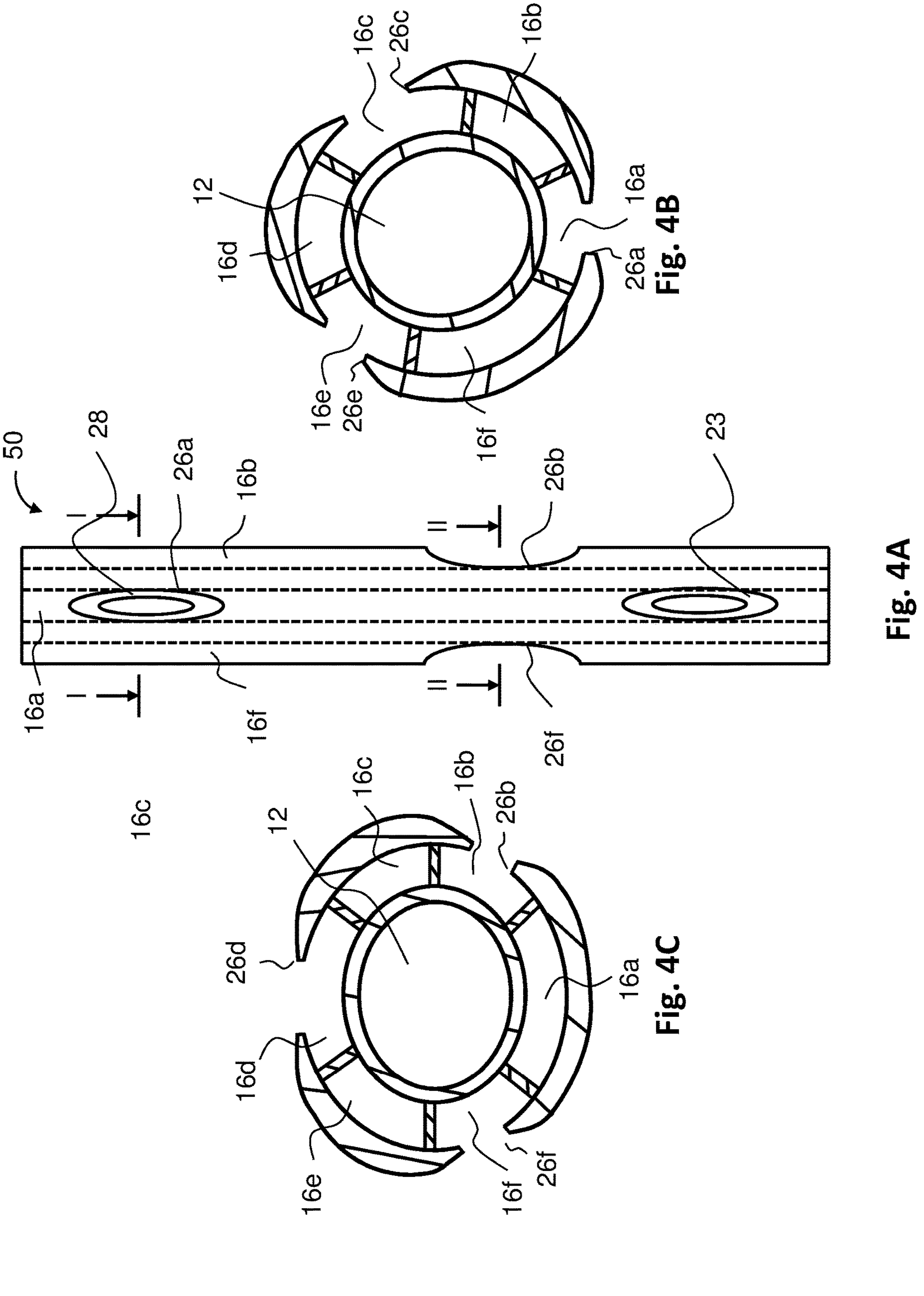
FIG. 4A is a simplified, schematic illustration of a transparent front view of a portion of a nasogastric tube, constructed and operative in accordance with another embodiment of the present invention.
FIG. 4B is a simplified schematic illustration of a cross-section along line I-I of the nasogastric tube of FIG. 4A.
FIG. 4C is a simplified schematic illustration of a cross-section along line II-II of the nasogastric tube of FIG. 4A.

Reference is now made to FIGS. 4A, 4B and 4C. FIG. 4A is a simplified, schematic illustration of a transparent front view of a portion of a nasogastric tube 50, constructed and operative in accordance with another non-limiting embodiment of the present invention. FIG. 4B is a simplified schematic illustration of a cross-section along line I-I of nasogastric tube 50 of FIG. 4A. FIG. 4C is a simplified schematic illustration of a cross-section along line II-II of nasogastric tube 50 of FIG. 4A. Nasogastric tube 50 is generally similar to nasogastric tube 10 of FIG. 1. The differences between nasogastric tube 10 and nasogastric tube 50 are detailed herein below. FIG. 4A shows a proximal portion of nasogastric tube 50 to be inserted into a patient's esophagus and with respect to it. Nasogastric tube 50 includes an additional upper portion, which is not shown, that is left outside of the patient's body and is coupled with, for example, vacuum source 18, pressure regulator 20 or valve 22. Nasogastric tube 50 includes main lumen 12 and six vacuum lumens 16, specifically denoted 16*a*, 16*b*, 16*c*, 16*d*, 16*e* and 16*f*. However, in other embodiments (not shown), a different number of vacuum lumens, such as four or more, may be used. Nasogastric tube 50 further includes a decompression port(s) 23 located distal to the longitudinal location of suction ports 26*b*, and 26*f*, as shown in FIG. 4A. Decompression port(s) 23 are, in some embodiments, configured to be positioned inside a stomach or a duodenum.

Each vacuum lumen 16 includes a suction port 26, specifically denoted 26*a*, 26*b*, 26*c*, 26*d*, 26*e* and 26*f* correspondingly. Therefore, each of suction ports 26 is associated with one of lumens 16. Suction ports 26*a*, 26*b*, 26*c*, 26*d*, 26*e* and 26*f* are distributed along a longitudinal axis of nasogastric tube 50. Suction ports 26*a*, 26*c* and 26*e* are located above suction ports 26*b*, 26*d* and 26*f* along the longitudinal axis of nasogastric tube 50 and with respect to a patient's body. Such a longitudinal axis may be advantageously located within main lumen 12.

With specific reference to FIGS. 4B and 4C, FIG. 4B shows a cross-section of suction ports 26*a*, 26*c* and 26*e*. Suction ports 26*a*, 26*c* and 26*e* are peripherally distributed around main lumen 12 in the same longitudinal location with respect to main lumen 12 (i.e., along a longitudinal axis of nasogastric tube 50). FIG. 4C shows a cross-section of suction ports 26*b*, 26*d* and 26*f*. Suction ports 26*b*, 26*d* and 26*f* are peripherally distributed around main lumen 12 in the same longitudinal location with respect to main lumen 12, as shown in FIG. 4A. The longitudinal location of suction ports 26*a*, 26*c* and 26*e* is different from and located above the longitudinal location of suction ports 26*b*, 26*d* and 26*f*, as shown in FIG. 4A. Generally, without limitation, the distance between suction ports 26*a*, 26*c* and 26*e* and 26*b*, 26*d* and 26*f* is in the range of 50 to 250 mm, or 100 to 150 mm.

Therefore, for example, applying vacuum to vacuum lumens 16*a* or 16*c* or 16*e* or to any combination thereof, allows sealing of the esophagus against nasogastric tube 50 in different peripheral locations (i.e., depending on the vacuum lumens which are used) and in different levels (i.e., depending on how many vacuum lumen are used) but in a specific longitudinal location (denoted by line I-I with respect to nasogastric tube 50 in FIG. 4A). In order to allow maximal sealing of the esophagus, vacuum may be applied to vacuum lumens 16*a*, 16*c* and 16*e* together at the same time. Applying vacuum to vacuum lumens 16*b* or 16*d* or 16*f* or to a combination thereof, would result the same correspondingly but in different peripheral locations with respect to main lumen 12 (i.e., according to the peripheral locations of vacuum lumens 16*b*, 16*d* or 16*f*) and in particular, in a different longitudinal location along nasogastric tube 50, denoted by line II-II in FIG. 4A. Vacuum may be also applied to vacuum lumens located in different longitudinal locations along nasogastric tube 50 at the same time.

Hence, the location of the vacuum lumens within the nasogastric tube according to the present invention determines the peripheral location of the applied vacuum and the location of the suction ports determines the longitudinal location of the applied vacuum within the esophagus. It should be noted that the positioning of nasogastric tube 50 within the esophagus as performed by the attending caregiver should be also considered. Switching the applied vacuum between the vacuum lumens allows applying vacuum on the esophagus inner wall at different locations peripherally and longitudinally during time, thus diminishing or preventing damage to the esophagus tissue facing the suction ports.

Valve 22 may be used to switch the vacuum between one or more vacuum lumens 16. Valve 22 may be separately connected to each vacuum lumen 16 or, for example, connected to all of vacuum lumens 16 having suction ports 26 at the same longitudinal location with respect to nasogastric tube 50 together. Obviously, the latter setup of valve 22 allows less freedom in switching between vacuum lumens 16. Hence, valve 22 may be used to switch the applied vacuum after a time duration from one or more vacuum lumens located at specific peripheral and longitudinal locations to one or more vacuum lumens located at other peripheral locations or furthermore at other longitudinal locations. Such a switch may be preformed gradually in order to keep the esophagus sealed at least to some extent against nasogastric tube 50 during the switch.

Nasogastric tube 50 may include two or more vacuum lumens 16 which peripherally surround main lumen 12. At least two of vacuum ports 26 are located at different longitudinal locations along nasogastric tube 50 in order to allow a longitudinal location switch within the esophagus.

Suction ports 26 are elliptical but may be of any other form, such as circular. Suction ports 26 may include a graduated edging 28 to prevent or diminish damage to the esophagus tissue while an inner wall of the esophagus is pressed against suction ports 26. Graduated edging 28 is advantageously graduated in an obtuse angle. Graduated edging 28 may be graduated entirely or only include a graduated portion. Generally, graduated edging 28 may provide each of suction ports 26 with a concave shape, having an opening approximately in its middle.

Nasogastric tube 50 may be coupled with a manifold (not shown). The manifold may connect vacuum lumens 16 to valve 22 in a separate manner to allow vacuum application to one or more vacuum lumens 16. The manifold may be transparent in order to visually monitor backflow of gastric substances, such as bile.

In some embodiments, at least one suction port 26 may include two or more suction ports, successively arranged along a portion of a longitudinal axis of nasogastric tube 50.

Figure 7A:
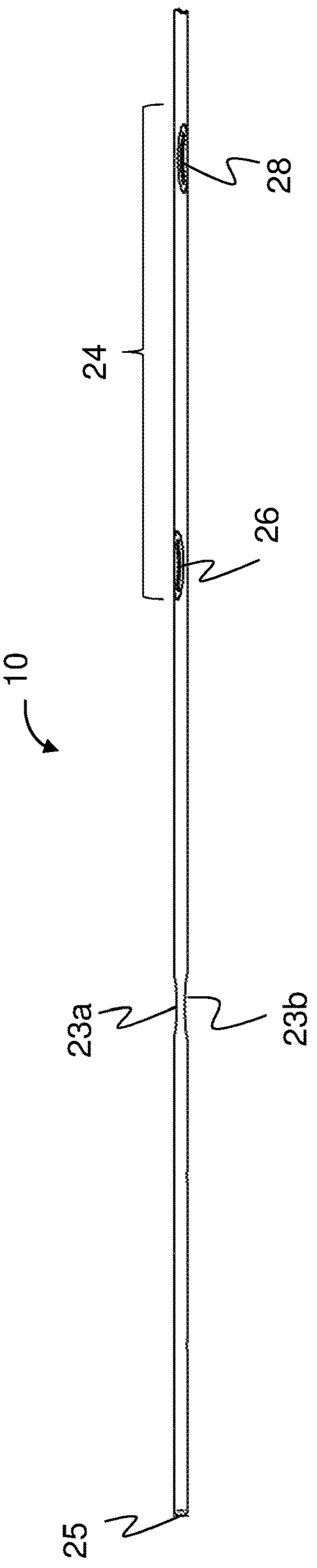
FIG. 7A is a simplified, schematic illustration of a portion of a nasogastric tube in accordance with a non-limiting embodiment of the present invention.
Figure 7B:
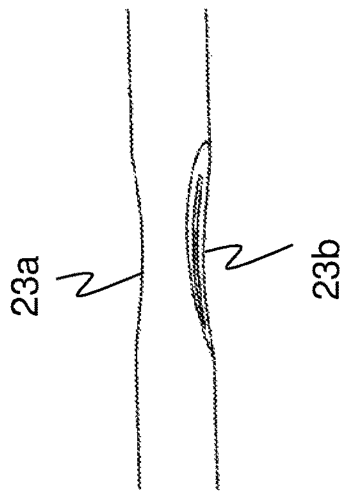
FIG. 7B is a simplified enlarged illustration of a portion of the nasogastric tube comprising the decompression ports, in accordance with a non-limiting embodiment of the present invention.

Reference is now made to FIGS. 7A and 7B. FIG. 7A illustrates a simplified, schematic illustration of a portion of an NGT 10, constructed and operative in accordance with a non-limiting embodiment of the present invention. FIG. 7B is a simplified and enlarged illustration of a distal portion of the NGT comprising one or more gastric decompression ports. NGT 10 includes, for example, a vacuum sealing portion 24 comprising two suction ports 28 and 26 distributed between two different locations along the length of NGT 10. NGT 10 further includes one or more gastric decompression ports 23*a* and 23*b* disposed distally to the vacuum sealing portion 24. Typically, the one or more gastric decompression ports 23*a* and 23*b* are configured to be positioned inside a stomach and/or a proximal duodenum.

Generally, without limitation, the distance between one or more gastric decompression ports 23 to at least one suction port is in the range of 50 to 200 mm.

The one or more gastric decompression port(s) 23 is associated with at least one of vacuum lumen 16 (not shown). In some embodiments, the one or more gastric decompression port(s) 23 is associated with a vacuum lumen 16 which comprises one or more suction ports 26. In other embodiments, the one or more gastric decompression port(s) 23 is associated with at least one additional vacuum lumen 16 (such as a vacuum lumen 16 devoid of suction ports 26). Gastric decompression port(s) 23 may be configured to be positioned inside a stomach. Gastric decompression port(s) 23, in another embodiment, may be configured to be positioned inside a proximal duodenum. Gastric decompression port 23 is, in some embodiments, disposed distally to vacuum sealing portion 24 (and suction ports 28 and 26). Decompression port(s) 23 may be elliptical or of any other form, such as circular.

NGT 10 further includes one or more feeding port 25 at the distal end of main lumen 12. In additional embodiments, such as for simultaneous feeding and decompression, the one or more feeding ports 25 are distal to the one or more gastric decompression ports 23. Feeding port 25 may be configured to be positioned in the stomach or in the duodenum. Generally, without limitation, the distance between one or more gastric decompression ports 23 to at least one feeding port is in the range of 50 to 300 mm, or in the range of 100 to 200 mm.

In one embodiment, the one or more gastric decompression port(s) 23 are configured to be positioned in a position selected from a distal esophagus (i.e., distal to vacuum sealing portion 24), inside a stomach, proximal duodenum, or a combination thereof. In embodiments wherein gastric decompression port(s) 23 are configured to be positioned in the proximal duodenum, feeding port 25 may be configured to be positioned in a distal duodenum.

Vacuum lumen 16 comprising a decompression port 23 may be constructed of similar materials to vacuum lumen 16 comprising suction ports 26, but alternatively may be constructed of medically safe metals, such as but not limited to, stainless steel, titanium alloys, NITINOL and others.

As known to one skilled in the art, the system described herein may further comprise a guiding probe (e.g., a stylet) for inserting the NGT to a subject. Said guiding probe is typically is removed after confirming the correct placement of the NGT.

A method of using NGT 50 of the present invention may include the following steps, without limitation and not necessarily in sequential order:

a) introducing the NGT into an esophagus of a patient;
b) applying vacuum to one or more decompression ports; and
c) applying vacuum to one or more suction ports interchangeably between the differently located suction ports so as to sealingly draw an inner wall of the esophagus thereagainst each time in a different location along the esophagus.

The vacuum may be applied to vacuum lumen(s) comprising one or more decompression ports in a constant manner or alternatively in timely intervals. As such, vacuum may be applied to the decompression ports prior to, during or after a patient is being fed by the NGT described herein. In additional embodiments, vacuum may be applied to the decompression ports according to the subject request, such as in result to abdominal discomfort, including but not limited to, excessive gastric gas or the like.

The vacuum may be applied to one or more vacuum lumens each time, and in each time to vacuum lumens which include suction ports peripherally distributed around the same location along a longitudinal axis of the NGT (for example, vacuum lumens 16*a* and 16*c* or vacuum lumens 16*b*, 16 *d* and 16*f* of FIGS. 4A, 4B and 4C) or peripherally distributed around different locations along a longitudinal axis of the NGT (for example, vacuum lumens 16*a* and 16*d* of FIGS. 4A, 4B and 4C).

The interchanging between the vacuum lumens to which a vacuum is applied may be performed at various manners, for example, it may be performed once or more per patient while each location change may be performed once in a constant or variable period of time, all according to the caregiver discretion regarding the specific patient.

The method may further include the step of regulating the vacuum so that a suction level is not constant over time in the suction ports. The vacuum may be regulated to the vacuum ports so as to create peristaltic movement or other oscillatory movement of the esophagus.

In some embodiments, the vacuum may be applied such that to restricts at least 60% of passage through the esophagus.

The method may further include the step of visually monitoring a transparent manifold which couples the vacuum lumens with a valve for backflow of gastric substances, such as bile.

In some embodiments of the present invention, the present invention may be utilized to insert one or more probes through main lumen 12, through one or more of vacuum lumens 16 and/or through a different, dedicated lumen (not shown) into the patient's body. Such probes may include, for example: a temperature sensor, an electromagnetic radiation sensor, a pH sensor, an image sensor, a fiber optic, an ultrasound probe, an OCT (optical coherence tomography) probe, a mini MRI (magnetic resonance imaging) probe, etc.

Figure 6:
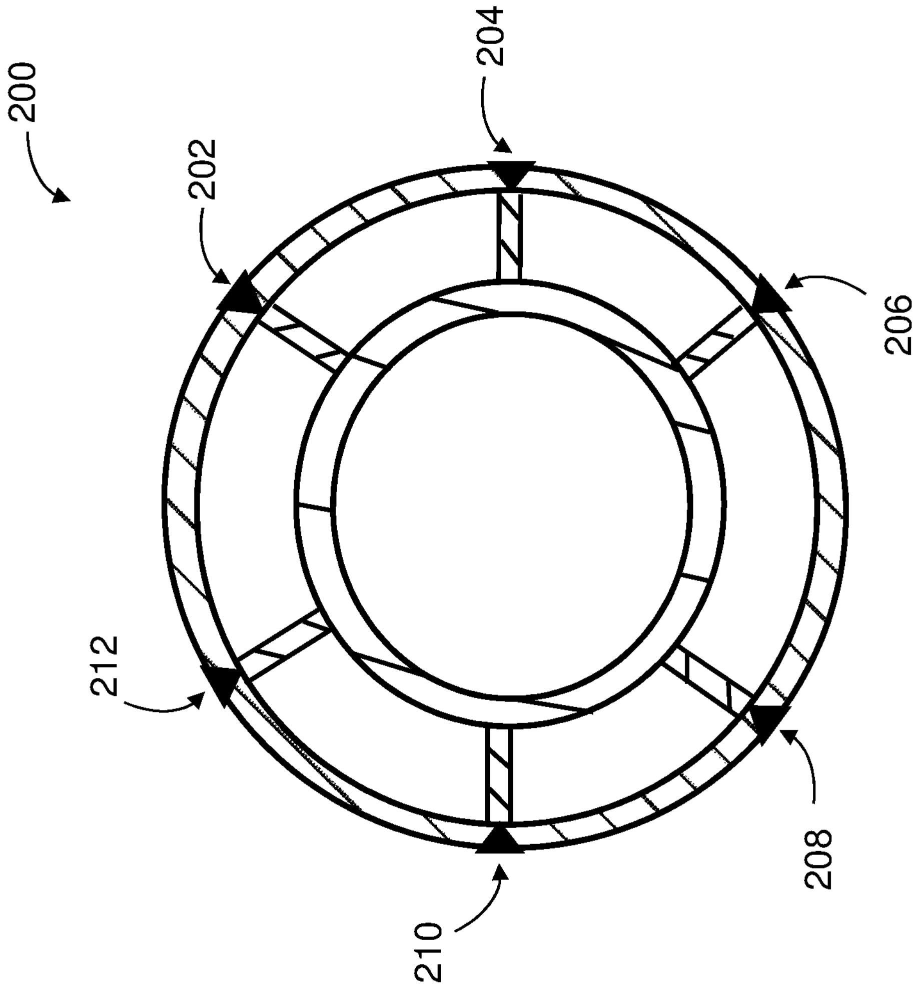
FIG. 6 is a cross section of a nasogastric tube.

Reference is now made to FIG. 6, which shows a cross section of a nasogastric tube 200, optionally similar to tube 10 (FIGS. 1-2) and/or to tube 50 (FIGS. 4A-4C). For simplicity of illustration, the cross section is shown at a portion of the tube which lacks any suction ports.

Tube 200 may include one or more radiopaque stripes, such as stripes 202-212, disposed along the longitudinal axis of the tube. Radiopaque stripes 202-212 may be visible, when tube 200 (or a portion thereof) is inside the patient, using X-ray imaging and/or other types of electromagnetic radiation imaging. That is, radiopaque stripes 202-212 are made of a radiodense material which inhibits the passage of some or all electromagnetic radiation, thereby creating a contrast in relation to more radiolucent body tissue and/or radiolucent portions of a medical device. Generally, if two or more parallel, longitudinal radiopaque stripes are present, the resulting electromagnetic radiation image may enable a better depth perception of the tube. This, since one or more of the stripes may be farther away from the imager than other one or more of the stripes. Furthermore, having two or more parallel, longitudinal radiopaque stripes may enable visualizing a situation in which the tube is twisted; this will result in a spiral-like image of the stripes.

An example of a suitable radiodense material is Barium sulfate, but those of skill in the art will recognize that other known radiodense materials may be used. In case Barium sulfate is used, its density in stripes 202-212 may be, for example, between 40-60%, between 60-80% or higher. The remainder percentage may be one or more filler materials.

Stripes 202-212, whether by virtue of their high-percentage Barium sulfate contents and/or their thickness, may endow tube 200 with a certain rigidity. This rigidity is to a degree which assists the caregiver in pushing the tube down the GI tract (or any other bodily lumen) on one hand, but still allows the tube to resiliently maneuver through the pertinent bodily lumen.

Optionally, one or more of stripes 202-212 may have an essentially triangular cross section, as shown in the figure. One apex of the triangle may be directed towards the inside of tube, and the base opposite to that apex may be directed towards the outside of the tube. In other embodiments (not shown), one or more of the stripes may have a rectangular cross-section, a circular cross-section, or an otherwise shaped cross-section.

Stripes 202-212 are optionally embedded, at least partially, in the outer wall of tube 200. Further optionally, stripes 202-212 may slightly protrude beyond the outside surface of the tube. For example, the protrusion may be by 50-100 micrometers, 100-150 micrometers, 150-250 micrometers, 250-400 micrometers or more. This protrusion may enable the caregiver holding tube 200 to get a better grip of the tube, especially when the tube has to be rotated. The protrusion may prevent the tube from slipping in the caregiver's hands while rotated.

In some embodiments, said main lumen comprises at least one feeding port at or adjacent to the distal end of said nasogastric tube. As used herein "adjacent to the distal end of said nasogastric tube" refers to at most 10 cm, at most 9 cm, at most 8 cm, at most 7 cm, at most 6 cm, at most 5 cm, at most 4 cm, at most 3 cm, at most 2 cm, at most 1 cm, at most 0.75 cm, at most 0.5 cm, at most 0.25 cm from the distal end of said nasogastric tube. Each possibility is a separate embodiment of the present invention.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

The invention claimed is:

1. A method comprising:

introducing an enteral tube into an esophagus of a patient, the enteral tube comprising:

(a) a main lumen having one or more proximal connectors configured to connect to a source of substances or pressure;

(b) a feeding port at a distal end of the main lumen;

(c) one or more vacuum lumens peripherally surrounding the main lumen;

(d) one or more suction ports configured to sealingly draw an inner wall of the esophagus thereagainst, each of the one or more suction ports being associated with a different one of the one or more vacuum lumens; and (e) at least one gastric decompression port disposed distally to the one or more suction ports along a length of the enteral tube and proximally to the feeding port, wherein the at least one gastric decompression port is associated with one of the one or more vacuum lumens associated with one of the one or more suction ports;

applying a vacuum to the one or more vacuum lumens so as to sealingly draw the inner wall of the esophagus against the one or more suction ports and to decompress gastric fluid via the at least one gastric decompression port while the inner wall of the esophagus is sealingly drawn against the one or more suction ports.

2. The method of claim 1, the enteral tube comprising a plurality of the one or more suction ports, wherein the applying of the vacuum to the one or more vacuum lumens comprises interchangeably applying the vacuum to a vacuum tube associated with one of the plurality of the one or more suction ports, each time in a different location along the esophagus.

3. The method of claim 1, further comprising regulating the vacuum so that a suction level is not constant over time.

4. The method of claim 1, the enteral tube comprising a plurality of the one or more suction ports, the method further comprising regulating the vacuum applied to the one or more vacuum lumens associated with the plurality of the one or more suction ports, so as to create peristaltic movement or other oscillatory movement of the esophagus.

5. The method of claim 1, the enteral tube comprising a plurality of the one or more suction ports, wherein the plurality of the one or more suction ports are peripherally distributed around a same location along a longitudinal axis of the enteral tube.

6. The method according to claim 1, wherein the applying of the vacuum to the one or more suction ports restricts at least 60% of passage through the esophagus.

7. The method according to claim 1, wherein each of the one or more suction ports comprises a graduated edging.

8. The method of claim 1, wherein a distance between the at least one gastric decompression port and the one or more suction ports is in the range of 50 to 200 mm.

9. The method of claim 1 wherein the applying of the vacuum to the at least one gastric decompression port is constant.

10. The method of claim 1 wherein the applying of the vacuum to the at least one gastric decompression port is according to timed intervals.

11. The method of claim 1 wherein the vacuum to the at least one gastric decompression port is applied after feeding of the patient.

12. The method of claim 1 wherein the vacuum to the at least one gastric decompression port is applied according to a need of the patient.

13. The method of claim 1, further comprising feeding the patient via the feeding port while decompressing gastric fluid via the at least one gastric decompression port.

14. The method of claim 1, the enteral tube comprising a plurality of the one or more suction ports, wherein the plurality of the one or more suction ports are peripherally distributed at different locations along a longitudinal axis of the enteral tube.

15. The method of claim 1, the enteral tube comprising four or more of the one or more suction ports.

* * * * *